Figure 1:
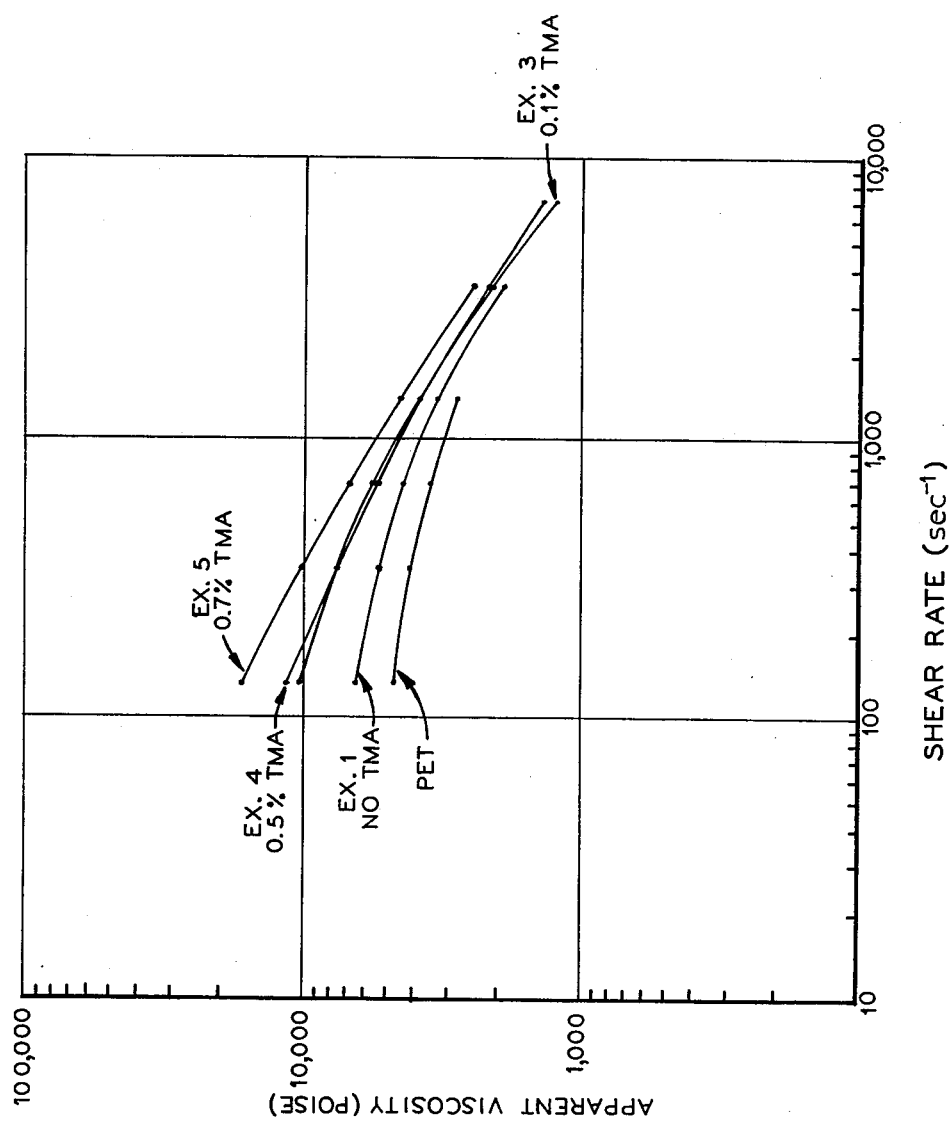

United States Patent [19]

Go

[11] 4,196,275

[45] Apr. 1, 1980

[54] THERMOPLASTIC POLYESTERS PREPARED FROM BIS(4-β-HYDROXYETHOXYPHENYL)SULFONE

[75] Inventor: Santos W. Go, Toledo, Ohio

[73] Assignee: Owens-Illinois, Inc., Toledo, Ohio

[21] Appl. No.: 969,025

[22] Filed: Dec. 13, 1978

Related U.S. Application Data

[62] Division of Ser. No. 861,141, Dec. 16, 1977.

[51] Int. Cl.$^2$ .................... C08G 63/66; C08G 63/68
[52] U.S. Cl. .................................................. 528/173
[58] Field of Search ........................................ 528/173

[56] References Cited

U.S. PATENT DOCUMENTS

| 2,593,411 | 4/1952 | Caldwell | 528/173 |
| 2,973,339 | 2/1961 | Muenster et al. | 528/173 |
| 3,558,557 | 1/1971 | Hrach et al. | 528/173 |

Primary Examiner—Lester L. Lee
Attorney, Agent, or Firm—Charles S. Lynch; M. E. Click; D. H. Wilson

[57] ABSTRACT

Disclosed are new copolyesters of terephthalic acid, bis(4-β-hydroxyethoxyphenyl)sulfone, ethylene glycol and a very small amount of trimellitic acid, particularly useful as molding compounds, especially for the extrusion-blow molding process of making hollow articles, and a method of making hollow articles.

2 Claims, 2 Drawing Figures

THERMOPLASTIC POLYESTERS PREPARED FROM BIS(4-β-HYDROXYETHOXYPHENYL)SULFONE

This application is a division of Ser. No. 861,141, filed Dec. 16, 1977.

Poly(ethylene terephthalate) resins are excellent molding compounds for making various hollow articles such as bottles for comestibles and the like. Poly(ethylene terephthalate) has good fatigue resistance and therefore its uses include applications where the product is subjected to fatigue inducing conditions, such as molding compounds for bottles known as squeeze bottles, wherein the product can be ejected from the container by a squeeze pressure. It is known to make various containers from poly(ethylene terephthalate) by first injection molding a preform, reheating the preform to approximately blowing temperature, placing the preform in the closed halves of a blow mold and blowing the preform to the desired shape.

The good fatigue resistance of poly(ethylene terephthalate) has been attributed to its crystalline structure and its tendency to become oriented, which increases strength.

One deficiency, however, of poly(ethylene terephthalate) has been its low glass transition temperature, which prevents its use as containers for many comestibles that are hot filled.

Another particular deficiency of poly(ethylene terephthalate) is that in the molten state it is a Newtonian fluid and as a consequence has poor melt strength. The practical effect of this is that containers of poly(ethylene terephthalate) cannot be produced by the process of extruding a soft tube of poly(ethylene terephthalate) and enclosing the tube in a blow mold and completing the blowing. This is because the poly(ethylene terephthalate) at the temperature necessary for extrusion as a tube will not maintain its tubular shape while warm even long enough to enclose the tube in the blow mold, because of its Newtonian behavior and poor melt strength. Thus, poly(ethylene terephthalate) performs or parisons for blow molding are made by injection molding.

The glass transition temperature of a polymer of terephthalic acid and ethylene glycol can be improved by replacing part of the ethylene glycol with bis(4-β-hydroxyethoxyphenyl)sulfone, but the resulting copolyester is also a nearly Newtonian fluid and has poor melt strength and, consequently, also cannot be used in the extrusion-blow molding method of making containers.

Newtonian flow is defined as the type of flow occurring in a liquid system where the rate of shear is directly proportional to the shearing force. Non-Newtonian flow is observed when the rate of shear is not directly proportional to the shearing force. Poly(ethylene terephthalate) exhibits Newtonian flow. The polyesters or copolyesters of the present invention have non-Newtonian flow and such non-Newtonian flow characteristics tend to impart melt strength to such polyesters.

I have now found that a high polymer thermoplastic copolyester resulting from polymerizing certain proportions of terephthalic acid, bis(4-β-hydroxyethoxyphenyl) sulfone (BSE), ethylene glycol (EG) and small amounts of trimellitic acid (TMA) or its anhydride or its low alkyl, $C_1$ to $C_4$, esters has good melt strength; the polymer so produced has non-Newtonian properties with a good relationship between the melt viscosity and the shear rate. Such polymers have somewhat less fatigue resistance (or folding endurance) than poly(ethylene terephthalate) but still entirely adequate for application to making squeeze bottles or other products that undergo significant flexing in use. Other desirable properties of the polymers will be discussed hereafter.

While it is believed that the desired non-Newtonian behavior of the polymer melt obtained by use of the trimellitic acid or its anhydride is because of cross linking of the polymer molecules, it has been found that the effect of such cross linking on folding endurance or fatigue resistance is really not predictable. Thus, while the use of pentaerythritol instead of trimellitic acid as a cross linking agent also increases the melt strength and creates the non-Newtonian property of the melt of such copolyesters, its use also nearly completely destroys the fatigue resistance or folding endurance of the resulting polymer.

It is an object of the invention to provide new thermoplastic polyesters having improved rheological properties combined with good physical properties.

It is another object of the invention to provide a new process for making hollow articles of ethylene terephthalate polyesters having a desirable combination of properties.

Other objects, as well as aspects and advantages of the invention, will become apparent from the accompanying disclosure and discussion.

According to one aspect of the present invention there is provided a thermoplastic copolyester consisting essentially of the polymeric reaction product of (A) reactant(s) selected from terephthalic acid and its $C_1$ to $C_4$ esters, and (B) reactants, bis(4-β-hydroxyethoxyphenyl) sulfone and ethylene glycol, and (C) reactant(s) selected from trimellitic acid, its anhydride, and its $C_1$ to $C_4$ alkyl esters, wherein the amount of said bis(4-β-hydroxethoxyphenyl) sulfone is 2–25, usually 2–20, mol percent of the amount of A reactants, the combined amount of B reactants is about 110 to 300 mol percent of the amount of A reactants, and the amount of C reactant(s) is 0.1 to 0.7 mol percent of said A reactants, said copolyester having oxygen ($O_2$) and $CO_2$ permeabilities in cc.mil/100 $in^2$.day.atm. of less than 9 and less than 62, respectively, a glass transition temperature, $T_g$, of at least 82° on an unoriented basis, said copolyester further having non-Newtonian flow properties. When more of the C reactant is employed, the folding endurance begins to decrease; moreover, the melt strength becomes so high that molding thereof is to all intents and purposes not practicably possible if much over 0.7 mol percent is used.

According to a further aspect of the invention I have provided a new method for making hollow articles. Thus, in the method of forming hollow articles from a polyester made from terephthalic acid or its lower esters and one or more dioles by making a hollow preform and enclosing said preform in a softened temperature condition in a blow mold and thereafter blow molding said preform into conformance with said blow mold walls, I have provided the improvement comprising forming said hollow preform as a tubular shape by free extrusion of a copolyester of my invention as defined hereinbefore.

As before noted, the use of carefully selected amounts of trimellitic acid or its anhydride enables the making of hollow articles by extruding a tubular preform and, while still hot and soft, enclosing said preform in a blow mold and blowing same. The inclusion of the BSE component serves, among other things, to lower the melting point of the polymer and thus allows a lower extrusion and especially a lower blowing temperature to be used without encountering premature crystallization in producing the hollow article. This in turn helps minimize thermal and oxidative degradation problems to which polyesters made from terephthalic acid are prone.

In the following illustrative examples and in the claims the oxygen and the carbon dioxide permeabilities refer to the determinations made on substantially unoriented pressed films.

The glass transition temperature, Tg, and the melting point were determined using a Perkin-Elmer differential scanning calorimeter, model DSC-2, in a manner similar to that described in U.S. Pat. No. 3,822,332 issued July 2, 1974, using a heating rate of 10° C./minute.

Figure 2:
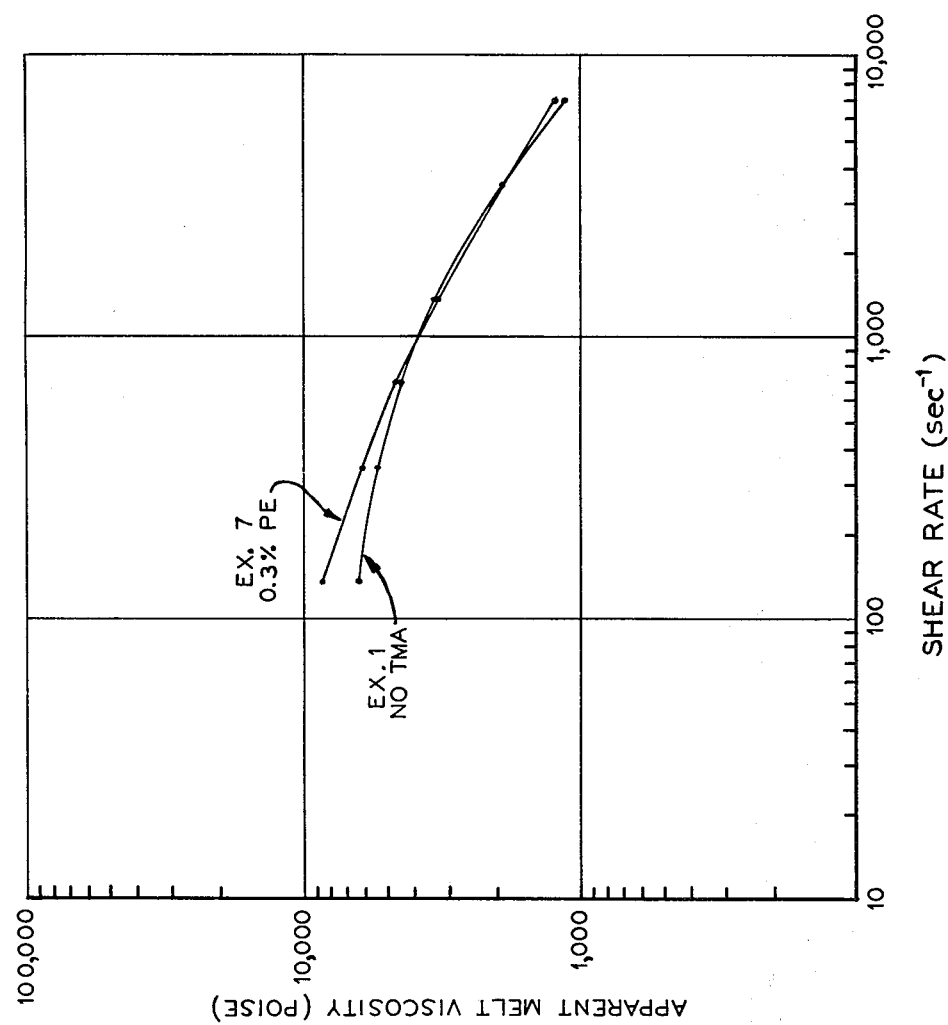

FIGS. 1 and 2 are plots of the apparent melt viscosity in poises versus shear rate. Such curves are explained in Severs, *Rheology of Polymers*, Rheinhold, New York, 1962, pp. 25 et seq. Apparent viscosity is the ratio of the shear stress over shear rate. The data was obtained using an Instron Capillary Rheometer using a melt temperature of 270° C. Fig. 1 includes a plot for "pure" poly(ethylene terephthalate) (PET) which is an essentially Newtonian fluid having completely unsatisfactory melt strength.

The inherent viscosities were measured at 25° C., using a solution of 0.25 gms. of polymer dissolved in 100 milliliters of a mixture of 3 weight parts phenol with 2 weight parts 1,1,2,2 tetrachloro-ethane. All polymers of the invention have inherent viscosities of over 0.6 measured in this manner.

Examples 2, 3, 4, 5, 8 and 9 are examples of copolyesters within the scope of the invention and each has the combination of properties set forth herinbefore for copolyester compositions of the invention.

EXAMPLE 1

Copolyester prepared from dimethyl terephthalate, ethylene glycol and bis(4-β-hydroxyethoxyphenyl) sulfone.

291.3 g of dimethyl terephthalate, 233.4 g of ethylene glycol and 0.0919 g of Mn(OAc)$_2$.4H$_2$O were charged into a 1-litter stainless steel reactor equipped with a stirrer, nitrogen gas inlet port and a condenser. The reaction mixture were heated to 190° C. for 2 hours, 210° C. for 2 hours under nitrogen atmosphere. Methanol was continuously distilled out during this period. Then 76.1 g of bis(4-β-hydroxyethoxyphenyl) sulfone, 0.1093 g of Sb$_2$O$_3$, 0.255 g of (PhO)$_3$P (i.e., triphenyl phosphite) and 0.0894 g of tetrakis [2,4-di-tertiarybutylphenyl] 4,4'-biphenylenediphosphonite were added into the reactor. The reaction temperature was raised to 260° C. and maintained for 45 minutes. The nitrogen gas flow was turned off and a vacuum of less than 0.4 mm Hg was applied. The reaction was continued at 275° C. for 4¼ hours. The inherent viscosity of the copolyester was 0.77. The polymer melt did not show adequate melt strength and was nearly Newtonian as shown in FIG. 1. A pressed film of about 10 mil thick required 48 times of cyclic foldings before losing its tear strength completely. The copolyester had a Tg of 98° C., oxygen permeability of 8.2 cc.mil/100in$^2$.day.atm. and a carbon dioxide permeability of 56.8 cc.mil/100in$^2$.day.atm. The melting point was 215° C.

EXAMPLE 2

Into a 1-liter stainless steel reactor equipped with a stirrer, nitrogen gas inlet port and a condenser, the following were added:
291.3 g of dimethyl terephthalate
233.4 g of ethylene glycol
76.1 g of bis(4-β-hydroxyethoxyphenyl) sulfone
0.0919 g of Mn (OAc)$_2$) 4H$_2$O
0.2882 g of trimellitic acid anhydride
(0.1 mol percent based on dimethyl terephthalate)

The reaction mixture was heated at 190° C. for 2 hours and at 210° C. for 2 hours under nitrogen atmosphere. Methanol was continuously distilled out during this period. Then the following compounds were added to the mixture in the reactor:
0.1093 g Sb$_2$O$_3$
0.225 g triphenyl phosphite
0.0894 g tetrakis [2,4-di-tertiarybutylphenyl] 4,4'-biphenylenediphosphonite The reaction temperature was increased to 260° C. and maintained for ½ hour under nitrogen atmosphere. Then the nitrogen gas flow was stopped and a vacuum of less than 0.4 mm Hg was applied. The reaction was continued at 275° C. under vacuum for 4 hours, 10 minutes. The copolyester has an inherent viscosity of 0.77. The polymer melt showed good melt strength. A pressed film of about 10 mil thick required 32 cyclic foldings before losing its tear strength. The melting point was 215° C. The glass transition temperature was 96° C. The oxygen and carbon dioxide permabilities were 8.3 and 56.8 cc.mil/100in$^2$.day.atm, respectively.

EXAMPLE 3

Into a 1-litter stainless steel reactor equipped with a stirrer, nitrogen gas inlet port and a condenser, the following were added:
291.3 g of dimethyl terephthalate
233.4 g of ethylene glycol
0.0919 g of Mn(OAc)$_2$.4H$_2$O The reaction mixture was heated at 190° C. for 2 hours and at 210° C. for 2 hours, 25 minutes under nitrogen atmosphere. Methanol was continuously distilled out during this period. Then the following compounds were added to the mixture in the reactor:
76.1 g bis(4-β-hydroxyethoxyphenyl) sulfone
0.1093 g Sb$_2$O$_3$
0.225 g triphenyl phosphite
0.0894 g tetrakis [2,4-diteriarybutylphenyl] 4,4'-biphenylenediphosphonite
0.8645 g trimellitic acid anhydride
(0.3 mol percent based on dimethyl terephthalate)

The reaction temperature was increased to 260° C. and maintained for 1 hour under nitrogen atmosphere. Then the nitrogen gas flow was stopped and a vacuum of less than 0.4 mm Hg was applied. The reaction was continued at 275° C. under less than 0.4 mm Hg for 4 hours and 5 minutes. The copolyester had an inherent viscosity of 0.68. The polymer melt possessed good melt strength. A pressed film of about 10 mil thick required 28 cyclic foldings before losing its tear strength completely.

EXAMPLE 4

Into a 1-liter stainless steel reactor equipped with a stirrer, nitrogen gas inlet port and a condenser, the following were added:

291.3 g dimethyl terephthalate
233.4 g ethylene glycol
0.0919 g Mn(OAc)$_2$.4H$_2$O The reaction mixture was heated, under nigrogen atmosphere, at 190° C. for 2¼ hours and at 210° C. for 2¼ hours. Methanol was continuously distilled out during this period. Then the following compounds were added to the reaction mixture in the reactor:

76.1 g bis(4-β-hydroxyethoxyphenyl) sulfone
0.1093 g Sb$_2$O$_3$
0.225 g triphenyl phosphite
0.0894 g tetrakis [2,4-di-tertiarybutylphenyl] 4,4'-biphenylenediphosphonite
1.441 g trimellitic acid anhydride
(0.5 mol percent based on dimethyl terephthalate)

The reaction temperature was increased to 260° C. After 1 hour, the nitrogen gas flow was stopped and a vacuum of less than 0.4 mm Hg was applied. The reaction was continued at 275° C. for 4 hours. The inherent viscosity of the copolyester was 0.80, Tg was 96° C. and the melting point was 211° C. The polymer melt possessed good melt strength as shown in FIG. 1. A pressed film of about 10 mil thick required 21 cyclic foldings before losing its tear strength completely. It had an oxygen permeability of 8.45 cc.mil/100in$^2$.day.atm., CO$_2$ permeability of 56.1 cc.mil/100in$^2$.day.atm.

EXAMPLE 5

Into a 1-liter stainless steel reactor equipped with a stirrer, nitrogen gas inlet port and a condenser, the following were added:

291.3 g dimethyl terephthalate (DMT)
233.4 g ethylene glycol
0.0919 g Mn (OAc)$_2$.4H$_2$O The reaction mixture was heated, under nitrogen atmosphere, at 190° C. for 2 hours and at 210° C. for 2 hours. Methanol was continuously distilled out during this period. Then the following compounds were added to the reaction mixture in the reactor:

76.1 g bis(4-β-hydroxyethoxyphenyl) sulfone
0.1093 g Sb$_2$O$_3$
0.225 g triphenyl phosphite
0.0894 g tetrakis [2,4-di-tertiarybutylphenyl] 4,4'-biphenylenediphosphonite
2.0174 g trimellitic acid anhydride
(0.7 mol percent based on DMT)

The reaction temperature was increased to 260° C. After 45 minutes, the nitrogen gas flow was stopped, and the reaction was continued at 275° C. for 4 hours, under less than 0.4 mm Hg vacuum. The inherent viscosity of the copolyester was 0.89, Tg was 96° C. and the melting point was 212° C. The polymer melt had good melt strength as shown in FIG. 1. A pressed film of about 10 mil thick required 21 cyclic foldings before losing its tear strength completely.

EXAMPLE 6

Into a 1-liter stainless steel reactor equipped with a stirrer, nitrogen gas inlet port and a condenser, the following were added:

291.3 g dimethyl terephthalate (DMT)
233.4 g ethylene glycol
0.0919 g Mn (OAc)$_2$.4H$_2$O The reaction mixture was heated, under nitrogen atmosphere, at 190° C. for 2 hours and at 210° C. for 2 hours, 20 minutes. Methanol was continuously distilled out during this period. Then the following compounds were added to the reaction mixture in the reactor:

76.1 g bis(4-β-hydroxyethoxyphenyl) sulfone
0.1093 g Sb$_2$ O$_3$
0.225 g triphenyl phosphite
0.0894 g tetrakis [2,4-di-tertiarybutylphenyl] 4,4'-biphenylenediphosphonite
2.882 g trimellitic acid anhydride
(1 mol percent based on DMT)

The reaction temperature was increased to 260° C. After 1 hour 20 minutes, the nitrogen gas flow was stopped, and the reaction was continued at 275° C. for 3 hours 45 minutes, under a vacuum of less than 0.4 mm Hg. The inherent viscosity of the copolyester was 1.08, the melting point was 212° C. and Tg was 98° C. The polymer melt strength was excessively high when using 1 mol percent as in this example, and in fact the apparent viscosity vs. shear rate curve could not be measured. Melt strength was thus too high for successful blow molding or extrusion. A pressed film of about 10 mil thick required 12 times of cyclic foldings before losing its tear strength completely.

EXAMPLE 7

Into a 1-liter stainless steel reactor equipped with a stirrer, nitrogen gas inlet port, and a condenser, the following were added:

291.3 g dimethyl terephthalate (DMT)
76.1 g bis(4-β-hydroxyethoxyphenyl) sulfone
218.6 g ethylene glycol
0.0919 g Mn (OAc)$_2$.4H$_2$O The reaction mixture was heated, under nitrogen atmosphere, at 190° C. for 4 hours. Methanol was continuously distilled out during this period. Then the following compounds were added to the reaction mixture in the reactor:

0.1093 g Sb$_2$O$_3$
0.09309 g triphenyl phosphite
0.1788 g tetrakis [2,4-di-tertiarybutylphenyl] 4,4'-biphenylenediphosphonite
0.6127 g Pentaerythritol (PE)
(0.3 mol percent based on DMT)

The reaction temperature was increased to 250° C. After 1 hour, the nitrogen gas flow was stopped, and the reaction was continued at 275° C. under 0.35 mm Hg vacuum for 4 hours. The inherent viscosity of the copolyester was 0.72. The polymer melt had fair melt strength as shown in FIG. 2. A pressed film of about 10 mil thick required 11 cyclic foldings before losing its tear strength completely. The copolyester had a Tg of 98° C., oxygen permeability of 8.4 cc.mil/100 in$^2$. day.atm., CO$_2$ permeability of 61.2 cc.mil/100 in$^2$.day.atm. and a melting point of 210° C.

EXAMPLE 8

Into a 1-liter stainless steel reactor equipped with a stirrer, nitrogen gas inlet port and a condenser, the following were added:

291.3 g dimethyl terephthalate (DMT)
233.4 g ethylene glycol
10.15 g bis(4-β-hydroxyethoxyphenyl) sulfone
0.0919 g Mn (OAc)$_2$.4H$_2$O
0.5764 g Trimellitic acid anhydride
(0.2 mol percent of dimethyl terephthalate)

The reaction mixture was heated at 190° C. for 2 hours and at 210° C. for 50 minutes under nitrogen atmosphere. Methanol was continuously distilled out during this period. Then the following compounds were added to the mixture in the reactor:
0.1093 g $Sb_2O_3$
0.225 g triphenyl phosphite
0.0894 g tetrakis [2,4-di-tertiarybutylphenyl] 4,4'-biphenylenediphosphonite
0.0369 g 2,2'4,4' tetrahydroxybenzophenone The reaction temperature was increased to 260° C. and maintained for 1 hour under nitrogen atmosphere. Then the nigrogen gas flow was stopped and a vacuum of less than 0.4 mm Hg was applied. The reaction was continued at 275° C. under vacuum for 4 hours. A pressed film of about 10 mil thick required 144 cyclic foldings before losing its tear strength completely. The copolyester had an inherent viscosity of 0.80. The polymer melt showed good melt strength. The melting point was 244° C. and Tg was 84° C. The oxygen and carbon dioxide gas permeabilities are 8.4 and 55.9 cc.mil/100 in$^2$.day.atm., respectively.

EXAMPLE 9

Using the same apparatus used in Example 7, the following were added:
291.3 g dimethyl terephthalate
233.4 g ethylene glycol
0.0919 g Mn $(OAc)_2.4H_2O$ The reaction mixture was heated at 190° C. for 2 hours and at 210° C. for 2 hours under nitrogen atmosphere. Methanol was continuously distilled off during this period. Then the following compounds were added to the mixture in the reactor:
126.9 g bis(4-β-hydroxyethoxyphenyl) sulfone
0.1093 g $Sb_2O_3$
0.225 g triphenyl phosphite
0.0894 g tetrakis [2,4-di-tertiarybutylphenyl] 4,4'-biphenylenediphosphonite
1.441 g trimellitic acid anhydride
(0.5 mol percent of dimethyl terephthalate)

The reaction temperature was increased to 260° C. and maintained for 35 minutes under nitrogen atmosphere. Then the nitrogen gas flow was stopped and a vacuum of less than 0.4 mm Hg was applied. The reaction was continued for 4 hours and 15 minutes under vacuum at 275° C. The copolyester had an inherent viscosity of 0.71. A pressed film about 10 mil thick required 17 cyclic foldings before losing its tear strength completely. The polymer had good melt strength and was noncrystalline. The oxygen and carbon dioxide gas permeabilities were 8.1 and 59.8 cc.mil/100 in$^2$.day.atm., respectively. The Tg is 100° C.

EXAMPLE 10

Using the same apparatus used in Example 7, the following were added:
291.3 g dimethyl terephthalate
233.4 g ethylene glycol
152.2 g bis(4-β-hydroxyethoxyphenyl) sulfone
0.0919 g Mn $(OAc)_2.4H_2O$
0.5764 g trimellitic acid anhydride
(0.2 mol percent DMT)

The reaction mixture was heated at 190° C. for 2 hours and at 210° C. for 1 hour under nitrogen atmosphere. Methanol was continuously distilled off during this period. Then the following compounds were added to the mixture in the reactor:
0.1093 g $Sb_2O_3$
0.0894 g tetrakis [2,4-di-tertiarybutylphenyl] 4,4'-biphenylenediphosphonite
0.225 g triphenyl phosphite The reaction temperature was increased to 260° C. and maintained for ½ hour under nitrogen atmosphere. Then the nitrogen gas flow was stopped and a vacuum of less than 0.4 mm Hg was applied. The reaction was continued at 275° C. for 3 hours and 40 minutes under vacuum. A pressed film about 10 mil thick required 12 cyclic foldings before losing its tear strength completely. The copolyester had an inherent viscosity of 0.62. The polymer had good melt strength and was non-crystalline. The $O_2$ and $CO_2$ permeability were 8.7 and 66.2 cc.mil/100 in$^2$. day.atm., respectively. The Tg was 105° C.

EXAMPLE 11

(This example is a repeat of Example 2 in U.S. Pat. No. 3,558,557 using ethoxylated Bisphenol A, 10% mol ethoxylated Bisphenol A)

Using the same apparatus used in Example 7, the following were added:
291.3 g dimethyl terephthalate
232.8 g ethylene glycol
47.5 g ethoxylated Bisphenol A
0.4078 g pentaerythritol (0.199 mol % of DMT)
0.0919 g Mn $(OAc)_2.4H_2O$ The reaction mixture was heated at 190° C. for 2 hours under $N_2$ atmosphere. Methanol was continuously distilled off during this period. Then the following compounds were added to the mixture in the reactor:
0.1093 g $Sb_2O_3$
0.225 g triphenyl phosphite
0.0894 g tetrakis [2,4-di-tertiarybutylphenyl] 4,4'-biphenylenediphosphonite The reaction temperature was increased to 260° C. and maintained for 50 minutes under $N_2$ atmosphere. Then the $N_2$ gas flow was stopped and a vacuum of less than 0.4 mm Hg was applied. The reaction was continued at 270° C. for 3 hours, 50 minutes, under vacuum. The copolyester had an inherent vixcosity of 0.69. A pressed film about 10 mil thick required 52 cyclic foldings before losing its tear strength completely. The melting point was 225° C. and Tg was 76° C. The $O_2$ and $CO_2$ gas permeabilities were 10.6 and 65.2 cc.mil/100 in$^2$.day.atm., respectively. The polymer had good melt strength.

EXAMPLE 12

Poly(ethylene terephthalate) was prepared as follows:
Into a 500 ml 3-necked round bottom flask, equipped with a nitrogen gas inlet tube, stirrer and a condenser, the following compounds were added:
46.5 g dimethyl terephthalate
35.4 g ethylene glycol
0.0263 g zinc acetate dihydrate
0.01398 g antimony trioxide The contents of the flask was heated at 220° C. under nitrogen atmosphere for 3 hours. During this time, methanol was distilled off. Then the reaction temperature was raised to 280° C., nitrogen flow was stopped and vacuum was gradually applied until less than 0.5 mm Hg. Excess ethylene glycol was continuously distilled off. The reaction was stopped after 4 hours. The inherent viscosity was 0.83, the glass transition temperature was 72° C., the oxygen permeability was 8.5 cc.mil/100 in$^2$.day.atm. and the carbon dioxide permeability was 55.3 cc.mil/100 in$^2$.day.atm. The product had very poor melt strength and had a melting point of 252° C.

Reference is made to U.S. Pat. No. 3,558,557, issued Jan. 26, 1971. From the disclosures of the monomer components of this patent it would be possible to pick the four reactants of the present invention. However, this patent is directed toward making polyesters especially for fiber applications, and properties pertinent to such application are emphasized.

Moreover, one would not know to pick the combination here disclosed in the amounts here disclosed to obtain the properties here set forth. For instance, column 5 equates trimellitic acid and pentaerythritol. As shown herein pentaerythritol will not give the combination of properties sought in that the folding endurance is unsatisfactory. See Example 7. Nor is Example 7 suggested, i.e., there is no suggestion that terephthalic acid and ethylene glycol be polymerized specifically with BSE and trimellitic acid or its anhydride. When one substantially repeats Example 2 of the patent (as in Example 11 herein) it is noted that in this example, which uses bis-phenol-A-diglycol ether instead of BSE, the oxygen and the carbon dioxide permeabilities are entirely unsatisfactory.

Other prior art in the general field is to be found on pages 2-3 of my copending application Ser. No. 812,921 filed July 5, 1977, but none of these references disclose or suggest the compositions or the process of the present invention.

As will be evident to those skilled in the art, various modifications of this invention can be made or followed in the light of the foregoing disclosure and discussion without departing from the spirit and scope of the disclosure or from the scope of the claims.

I claim:

1. A thermoplastic copolyester consisting essentially of the polymeric reaction of
   (A) reactant(s) selected from terephthalic acid and its $C_1$ to $C_4$ alkyl esters, and
   (B) reactants, bis (4-beta-hydroxyethoxyphenyl) sulfone and ethylene glycol, and
   (C) reactant(s) selected from trimellitic acid, its anhydride, and its $C_1$ to $C_4$ alkyl esters, wherein the amount of said bis (4-beta-hydroxyethoxyphenyl) sulfone is 2-25 mol percent of the amount of A reactant(s), the combined amount of B reactants is about 110 to 300 mol percent of the amount of A reactant(s), and the amount of C reactant(s) is 0.1 to 0.7 mol percent of said A reactants, said copolyester having oxygen ($O_2$) and $CO_2$ permeabilities in cc.mil/100 in.$^2$.day.atm. of less than 9 and less than 62, respectively, a glass transition temperature, Tg, of at least 82° on an unoriented basis, said copolyester further having non-Newtonian flow properties.

2. A copolyester of claim 1 wherein the amount of said bis(4-beta-hydroxyethoxyphenyl) sulfone is 2-20 mol percent of the amount of A reactant(s).

* * * * *